April 11, 1961  H. ORNER  2,978,936
MULTI-STAGE POWER OPERATED TORQUE WRENCH
Filed July 16, 1956  3 Sheets-Sheet 1
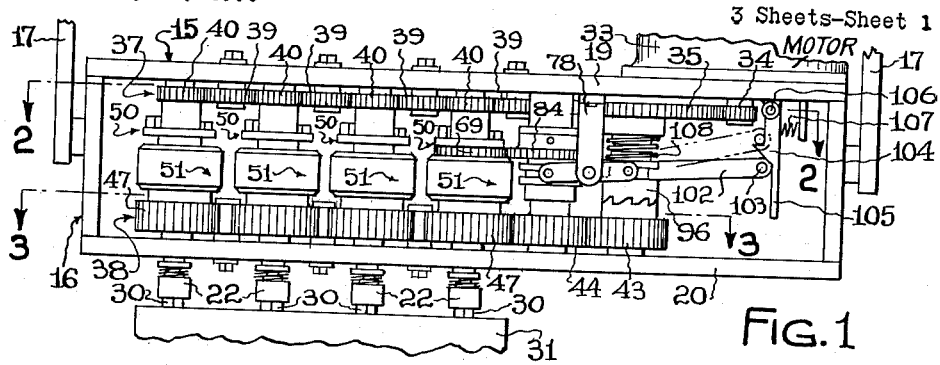
Fig. 1
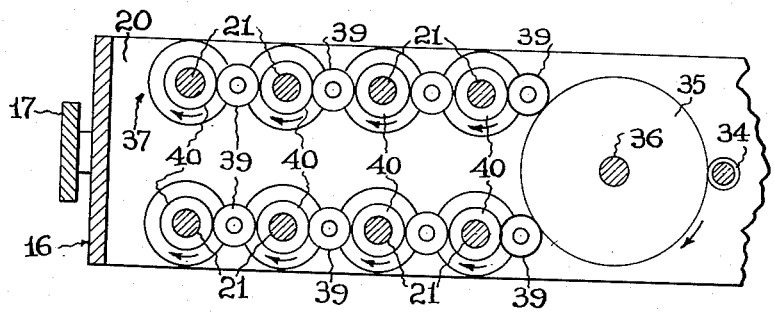
Fig. 2
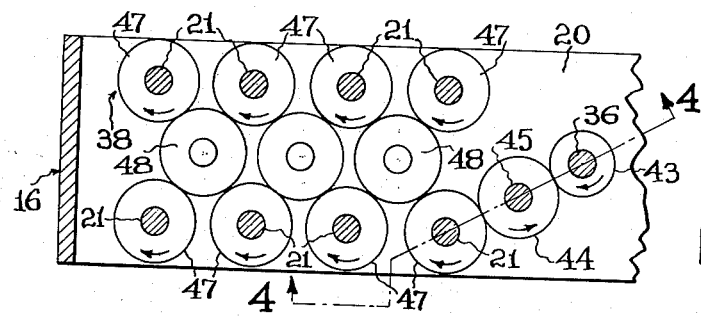
Fig. 3
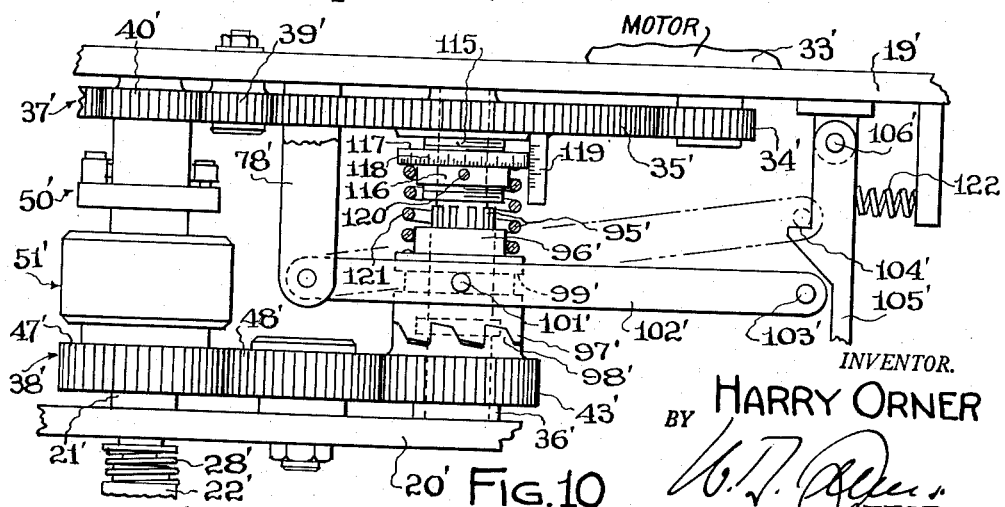
Fig. 10
INVENTOR.
HARRY ORNER
ATTORNEY.

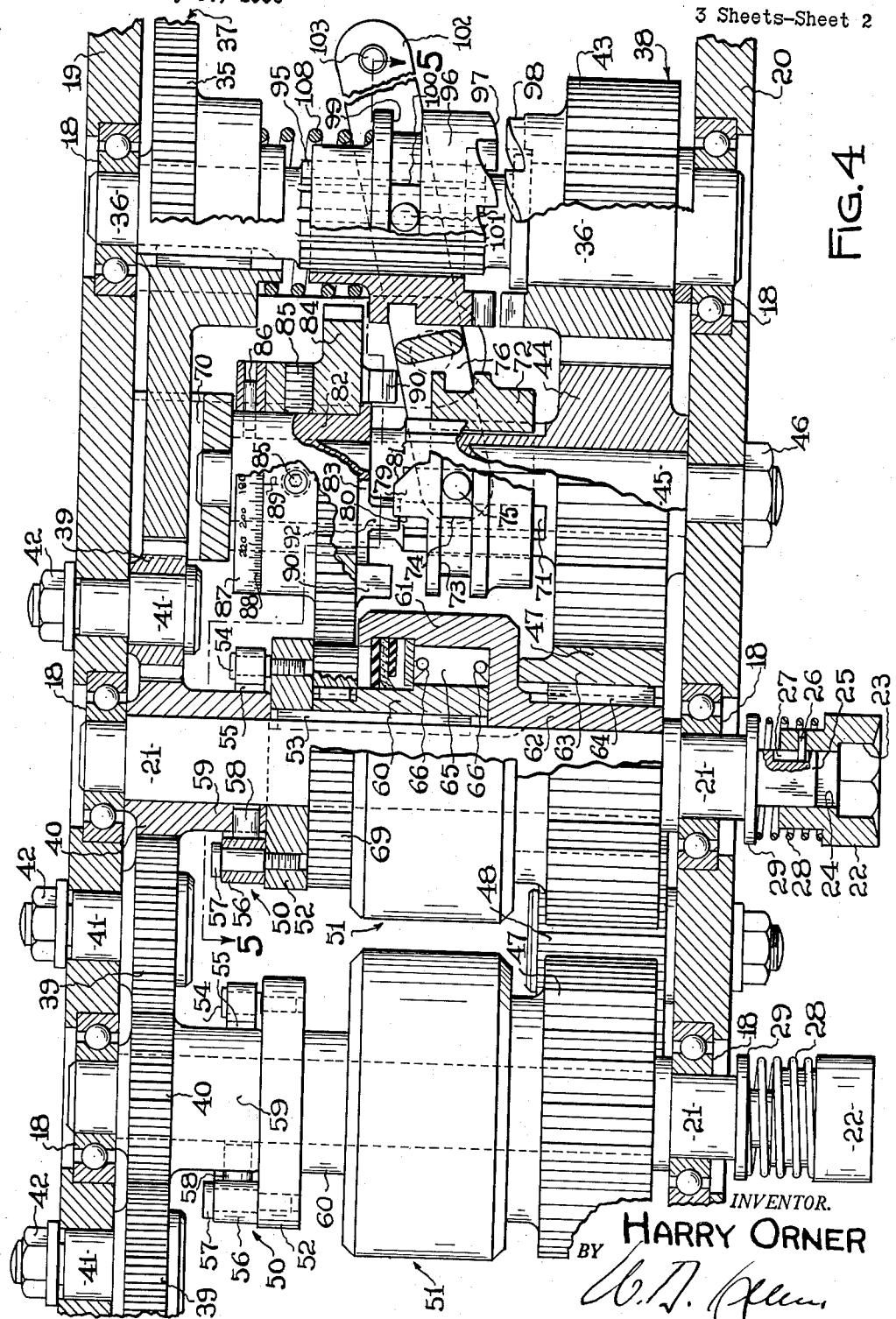

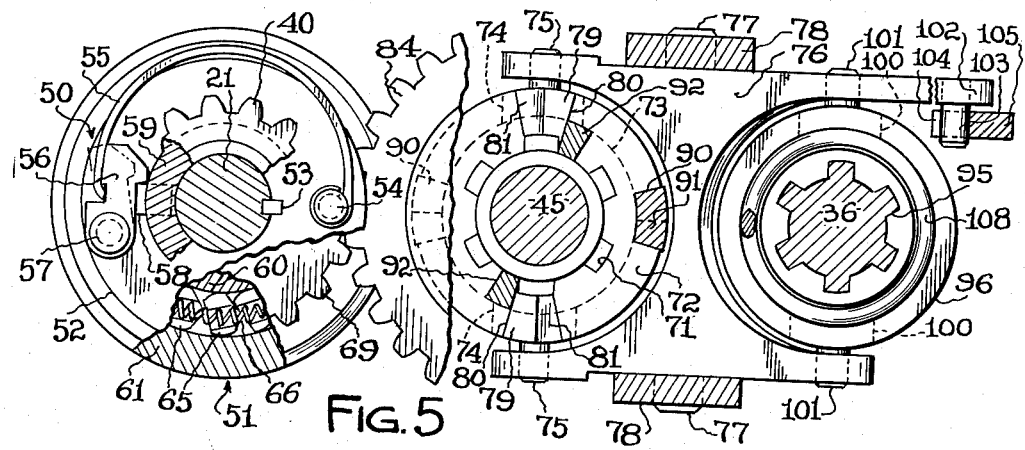
Fig. 5
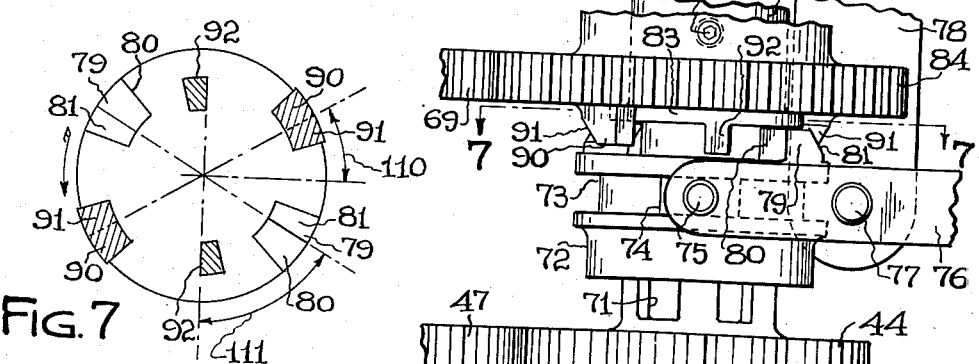
Fig. 6
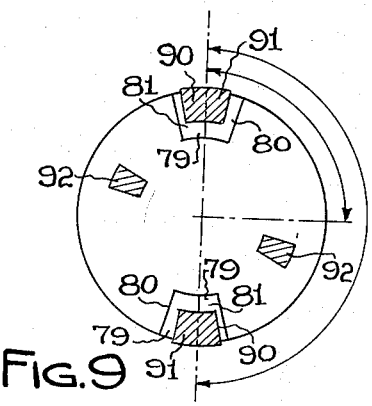
Fig. 7
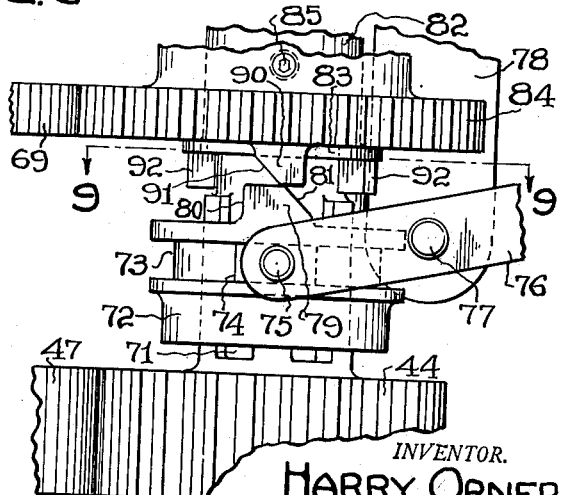
Fig. 8
Fig. 9
INVENTOR.
HARRY ORNER
BY
ATTORNEY.

United States Patent Office 2,978,936
Patented Apr. 11, 1961

2,978,936
MULTI-STAGE POWER OPERATED TORQUE WRENCH

Harry Orner, 2479 Glen Canyon Road, Altadena, Calif.

Filed July 16, 1956, Ser. No. 597,927

31 Claims. (Cl. 81—52.4)

This invention relates to torque wrenching devices and more particularly to a power-driven gang wrench for running a plurality of threaded fasteners simultaneously to remove all looseness and for thereafter simultaneously tensioning these fasteners to the same predetermined load tension. The invention also relates to an improved method of assembling parts by means of threaded fasteners and in which a plurality of fasteners are tensioned automatically and simultaneously to the same load values approaching the yield strength of the fasteners.

It has been the common practice to tighten single fasteners to a desired torque value with a power-driven wrench but the techniques employed have not been applicable satisfactorily in tensioning simultaneously a plurality of fasteners. Owing to variations in manufacturing tolerances, the friction between engaging surfaces of a pair of threaded members varies widely with the result that a torque-responsive release mechanism customarily employed disengages the power drive for the wrench prematurely in tightening fasteners having high friction losses. If the torque-responsive release mechanism is set to maintain the driving connection until high friction fasteners are fully tensioned, low friction fasteners tightened by the same mechanism are tensioned excessively and often fail.

Attempts to provide gang torque wrenches have been frustrated by the lack of a satisfactory means of assuring the uniform application of pressure between different portions of the parts being clamped by the fasteners. For example, in bolting the head of an internal combustion engine to its block, it is important that all portions of the head be advanced toward the block subsantially simultaneously and by generally equal pressures. Obviously such assurance could not be provided by torque responsive devices which released a hard turning nut or bolt prematurely. As a result the freely turning nuts and bolts could be rotated to advance the head toward the block while other portions adjacent the hard turning fasteners remained separated causing the head to jam or even to fracture. Even though such occurrences were the exception rather than the rule, these infrequent failures are irksome and costly in both material and time.

It has been found that fasteners may be loaded-tensioned uniformly to a predetermined value approaching the yield strength of the fastener material by a simple procedure involving two steps, namely, an initial step in which the fastener is turned sufficiently to remove looseness between the parts being clamped followed by wrenching the fastener through a final predetermined arc, it being known that the elongation of the fastener varies directly with the arc of final wrenching and the tensioning load thereby placed on the fastener. According to one mode of practicing the invention the common power source is used to remove all looseness of a plurality of fasteners simultaneously, the power drive to each being discontinued automatically when the looseness of the individual fasteners has been removed, and thereafter simultaneously tightening each fastener through identical arcs of predetermined magnitude known to load each fastener to a common value closely approaching the yield strength of the material. Substantially this same result is achieved in a second mode of practicing the invention wherein the second and final wrenching step is performed until the aggregate torque applied to all the fasteners reaches a value predetermined as required to tension the fasteners to a desired load.

As will be evident upon reflection the aggregate torque moment applied to a group of fasteners automatically takes into account variations in manufacturing tolerances, the presence of foreign matter, friction loss differences, etc. It will also be recognized that, by making a judicious selection of the aggregate torque value at which wrenching ceases, and by wrenching all fasteners in unison, the final load tension on each fastener is uniformly accurate and can be as close as desired to the yield strength of the fasteners. Additionally and of great importance, normally encountered variations from the desired aggregate torque values at which wrenching is discontinued are divided equally between the fasteners, thereby assuring extremely uniform load tensioning of the individual fasteners.

It is therefore a primary object of this invention to provide an improved power-driven gang wrenching device obviating the disadvantages of prior devices of this type and possessing advantages not available in wrenches of prior design.

Another object of the invention is to provide a gang wrench having a plurality of gear trains arranged for selective drive from a common power source together with means for utilizing either gear train to drive a plurality of fasteners.

Still another object is the provision of a power-driven gang wrench selectively operable to drive a plurality of threaded fasteners at different speeds during the initial and final tightening stages, respectively.

A further object of the invention is the provision of a gang wrench having a continuous power drive together with means for discontinuing automatically the initial wrenching operation of individual fasteners as each is tightened sufficiently to remove looseness, and for thereafter wrenching all of the fasteners in unison to a predetermined load tension.

Another object of the invention is the provision of a power torque wrench adapted to tighten threaded fasteners at high speed during an initial stage in which all looseness between parts is removed, and operable thereafter at low speed to tension the fasteners with precision to a desired load stress.

Still another object of the invention is the provision of a power-driven gang wrench having automatic means for discontinuing the simultaneous wrenching of a plurality of fasteners when the applied aggregate torque moment reaches a predetermined value and for thereafter locking the power drive out of operation until required for tightening another group of fasteners.

A further object of the invention is the provision of a new method of tightening a plurality of threaded fasteners simultaneously to a precise and uniform load stress.

Another object is the provision of a new method of securing parts together in which a plurality of fasteners are tightened in unison until the applied aggregate torque moment reaches a predetermined value whereby a high torque loss in one fastener is distributed uniformly among all the fasteners.

Another object of the invention is the provision of a gang torque wrench having low and high speed gear trains selectively operable to drive simultaneously a plurality of wrenching devices and including a torque responsive clutch interconnecting the two gear trains.

Another object of the invention is to provide a gang torque wrench having a common gear drive between a power source and a plurality of separate wrenches, together with means responsive to a predetermined aggregate torque resistance from said wrenches to disconnect the power source from the gear drive for the wrenches.

Still another object of the invention is the provision of a gang torque wrench employing a plurality of selectively operable gear trains together with means for removing backlash within one gear train while another is in use whereby upon the transfer of the drive to said one gear train all elements of the train are placed in motion simultaneously.

Another object of the invention is to provide a gang wrench operable to tighten each of a plurality of fasteners through identical final arcs to load each to a common stress representing the mean value of the predetermined aggregate stress for all of said fasteners.

These and other objects and advantages of the invention will be more fully set forth in the following specification and claims considered in connection with the attached drawings to which they relate.

Referring to the drawings:

Figure 1 is a side elevational view of a preferred embodiment of the invention, the parts being positioned to tighten a plurality of nuts through a final arc;

Figure 2 is a transverse sectional view taken along line 2—2 on Figure 1, illustrating diagrammatically the operation of the high speed gear train;

Figure 3 is a transverse sectional view taken on the line 3—3 of Figure 1 illustrating diagrammatically the operation of the low speed gear train;

Figure 4 is a fragmentary sectional view taken along the broken line 4—4 on Figure 3 and showing the individual wrenching devices connected for drive by the high speed gear train;

Figure 5 is a transverse sectional view taken along the broken line 5—5 on Figure 4 showing certain details of the torque release for the high speed gear train, certain parts of the speed responsive clutch mechanism, and certain features of the drive disconnector for the low speed gear train;

Figure 6 is a fragmentary side elevational view of a portion of the mechanism illustrated in Figure 4 but showing the parts in an alternate operating position;

Figure 7 is a diagrammatic view of certain elements of the low speed disconnector taken along the plane indicated by line 7—7 on Figure 6;

Figures 8 and 9 are views corresponding to Figures 6 and 7, respectively, but showing elements of the low speed gear disconnector in a different operating position; and Figure 10 is a fragmentary elevational view of an alternate embodiment of the invention.

The preferred embodiment of the invention illustrated in Figures 1 to 9 comprises a gang wrench designated generally 15 having a casing 16 adapted to be pivotally supported at its ends between the arms of a yoke 17, the latter being suspended from a suitable crane, conveyor or counterbalance device in well known manner to hold the gang wrench retracted when not in use. Rotatably supported in anti-friction bearings 18 supported in aligned openings in the opposite parallel walls 19 and 20 of the wrench casing 16 are a plurality of identical spindles 21, there being a separate spindle for each fastener device to be tightened by the wrench.

The means for detachably coupling the lower ends of each spindle to a fastener is best illustrated in Figure 4 as comprising a socket 22 having a hexagonal or other suitably shaped recess 23 for receiving a nut or the head of a cap screw. Aligned with recess 23 is a non-circular bore 24 which telescopes loosely about the similarly shaped end 25 of each of the spindles 21, socket 22 being held assembled to the spindle by means of a pin 26 carried by socket 22 and extending into a short groove 27 in the side wall of spindle end 25. Pin 26 is normally seated in the lower end of groove 27 due to the action of a compression spring 28 having one end seated on a shoulder of the socket and the other against a washer 29 assembled about end 25 of spindle 21.

Referring to Figure 1, it will be seen that each of the fastener receiving sockets 22 is shown as seated over the head 30 of a cap screw extending into a workpiece such as the cylinder head 31 of a gas engine, it being understood that the gang wrench of this invention would normally be specially designed to tighten simultaneously the nuts of a particular assembly such as an engine head. The gang wrench 15 is driven from a single source of power such as an electric motor 33 supported either directly on the wrench casing as shown in Figure 1, or connected thereto through a flexible cable. The small drive pinion 34 connected directly to the power source meshes with a large diameter gear 35 keyed to a spindle 36 (Figure 4) supported in bearings 18 mounted in upper and lower walls 19 and 20 of the wrench casing. Gear 35 forms part of the high speed gear train designated generally 37 and formed by a plurality of meshing gears rotatably supported in close parallel relation to casing wall 19. A similar set of meshing gears designated generally 38 is rotatably supported in close parallel relation to casing wall 20 and will be referred to frequently below as the low speed gear train. In addition to pinion 34 and gear 35, high speed gear train 37 comprises a plurality of idler gears 39 meshing with a plurality of driven gears 40, the latter being rotatably supported on spindles 21, and idler gears 39 being mounted on shouldered pins 41 rigidly secured to casing wall 19 by nuts 42. The low speed gear train 38 is generally similar to the high speed gear train 37 and includes a small diameter drive gear 43 rotatably supported on the lower end of shaft 36 and in mesh with a second idler gear 44, the latter being rotatably supported on a spindle 45 rigidly secured to casing wall 20 by a nut 46. Idler 44 meshes with the first of a series of similar driven gears 47 each of which is mounted for rotation about the lower end of an associated one of the spindles 21. As is made clear by Figure 3, driven gears 47 are interconnected with one another by idler gears 48 mounted on shouldered pins secured to casing wall 20 in a manner similar to pins 41 of the high speed gear train 37. It will be clear that the gears comprising the low speed gear train 38 are positively driven by gear 43, driven gears 47 being rotated clockwise and idler gears 44 and 48 being rotated counterclockwise.

Reference will now be had to the means for driving the fastener tightening devices selectively from either the high speed gear train 37 or from the low speed gear train 38. Mounted on each of spindles 21 between gear trains 37 and 38 are a pair of disconnectors consisting of a normally closed torque responsive disconnector designated generally 50, and a one-way clutch or speed responsive disconnector designated generally 51. Each of these pairs of disconnectors is composed of the same components connected between the adjacent elements of the torque wrench in the same manner. Accordingly, a description of one pair will provide an understanding of each.

Referring to Figures 4 and 5, it will be observed that the torque responsive disconnector 50 comprises a disc 52 keyed to spindle 21 by a key 53. Anchored to the top surface of disc 52 by pin 54 is a calibrated leaf spring 55 having its free end seated in a recess of a pawl 56 pivoted to the top side of disc 52 by a pin 57. Normally spring 55 holds pawl 56 in position to engage a detent 58 fixed to and projecting radially from hub 59 of gear 40 forming part of the high speed gear train 37. It will be evident therefore that so long as leaf spring 55 holds pawl 56 engaged with pin 58, gear 40 will be effective through disc 52 and key 53 to rotate spindle 21 in a clockwise direction. The strength of spring 55 is so selected relative to pawl 56 and pin 58 that the pawl and pin remain engaged until the torque resistance provided by a threaded fastener increases abruptly, thereby indicating that the looseness between the parts being clamped has been removed. In other words, as soon as the looseness between the parts being secured together has been removed, the torque resistance will increase abruptly and this increase is effective to disengage pawl 56 from pin 58. In consequence, the particular torque responsive disconnector 50 which has become disengaged is ineffective to drive the associated spindle 21, the remaining spindles continuing to be driven until the fastener being tightened by each has been run sufficiently to remove the looseness between parts and release its torque responsive disconnector 50.

Referring again to Figure 4 it will be noted that the speed responsive disconnector devices 51 comprise a sleeve 60 keyed to spindle 21 by key 53. Surrounding the lower end of sleeve 60 is a cup-shaped member 61 having a depending hub 62 journaled on spindle 21 and secured by key 64 to the hub 63 of one of the driven gears 47, it being recalled that gear 47 is a part of the low speed gear train 38. As is best shown in Figure 5, the annular space between sleeve 60 and member 61 is filled with a plurality of specially shaped tubular elements 65 known as "sprags," and operatively interconnected by a pair of coil springs 66 threaded through transverse openings in sprags 65. Speed responsive device 51 is available commercially under the trade name "Formsprag" and for that reason a more detailed showing and description will be unnecessary. The sprags or cam members 65 are so shaped and dimensioned relative to sleeve 60 and member 61 that clockwise rotation of member 61 at a rate greater than sleeve 60 effects engagement of these elements so that elements 60 and 61 operate at the same clockwise speed. Contrarywise, the clockwise rotation of member 61 at a lower speed than sleeve 60 disengages sprags 65 thereby rendering gear train 37 ineffective to drive spindles 21. If under these circumstances the low speed gear train 38 is being driven, gears 47 being coupled by keys 64 to hubs 62 of the clutch devices 51, are effective to drive spindles 21 and wrench the fastener devices 30 through the particular final wrenching arc required to bring them to a predetermined final load stress. The mechanism provided by the present invention for assuring that this final wrenching is performed through a precisely measured final arc will now be described.

The mechanism for measuring the arc of final wrenching and driving the low speed gear train 38 is best illustrated in Figure 4 wherein it will be observed that fixed spindle 45 has its upper end journaled in a U-shaped bracket 70 suitably secured to casing wall 19. Slidably supported in splined hub 71 of idler gear 44 is an internally splined collar 72 having an annular groove 73 seating a pair of rectangular blocks 74 provided with trunnions 75 adapted to be journaled in one end portion of a double yoke 76 (Figure 5). Projecting laterally from the opposite mid-portions of yoke 76 are a pair of trunnions 77 journaled in brackets 78 rigid with the inner side of casing wall 19. Projecting from one end of collar 72 are a pair of bosses 79 each having an axial side wall 80 and a cammed surface 81, it being understood that side walls 80 and cammed surfaces 81 of the respective bosses are spaced 180 degrees apart. As will become apparent below, the function of bosses 79 is to provide a zero starting point for the measurement of the arc of final wrenching despite the fact these bosses are located on the collar 72 which rotates with the low speed gear train.

Rotatably supported on spindle 45 opposite bosses 79 is a sleeve 82 having a radial flange 83 on its edge providing support for a gear ring 84, the hub of which may be anchored to sleeve 82 in any desired angular position by means of one or more set screws 85. Firmly fixed to the upper end of sleeve 82 as by a pin 86 is a scale ring 87 having a suitably marked scale 88 arranged along its edge opposite a position-indicating line 89 on the hub of gear 84. Gear 84 meshes with a gear ring 69 keyed to the upper end of sleeve 60 of the adjacent speed responsive disconnector 51. It will be evident therefore that gear 69 is driven in a clockwise direction whenever spindle 21 is being driven by either of the gear trains 38 or 37.

As is best illustrated in Figures 4, 7 and 9, ring gear 84 has a pair of diametrically disposed bosses 90 projecting downwardly from its lower surface, each having a straight side wall on one edge and an inclined or cam surface 91 positioned to lie in the path of cam surfaces 81 of bosses 79 on collar 72. Projecting from the flanged end of sleeve 82 are another pair of bosses 92 which, as is made clear by Figures 7 and 9, lie in the path of bosses 79 and cooperate with side wall 80 of the latter to serve two principal functions. One of these is to fix the zero starting point for the arc of final wrenching, and a second function is to drive gear train 38 during the initial wrenching operation for the important purpose of removing backlash from the various gear components of train 38 while the fasteners are being run down during the initial tightening operation. Owing to the difference in size of ring gear 69 and ring gear 84, it will be evident that the speed of train 38 is materially less than the speed of train 37 and that it continues to operate without load until the torque responsive device 50 to one side of greater 69 disengages. As a result there is no backlash in train 38 as the final wrenching operation begins. Furthermore, the parts are properly positioned at the zero setting in readiness to measure the final wrenching arc accurately.

Before proceeding to a description of the manually operative gear train selector, attention is invited to Figure 4 and the fact that, under all operating conditions, bosses 92 project beyond the ends of bosses 90 and into the path of bosses 79 carried by collar 72. In other words regardless of whether collar 72 is in its upper or lower operating position, as illustrated in Figure 4, bosses 92 and 79 overlap axially of spindle 45; however bosses 90 and 79 overlap only when collar 72 is in its upper operating position. The significance of this relationship will be explained presently.

The driving selector for selectively coupling the power source 33 to one of the gear trains 37, 38 includes the splined section 95 of driven shaft 36 on which is slidably supported a splined clutch collar 96 having cammed teeth 97 on one end positioned to mate with cammed teeth 98 on the hub of gear 43 rotatably mounted on the lower end of shaft 36. Clutch collar 96 has an annular groove 99 slidably seating a pair of blocks 100 from which project trunnions 101 journaled in one end portion of the double yoke 76 (Figures 4 and 5). Projecting from one corner of yoke 76 is an arm 102 having a detent pin 103 engageable behind a latch 104 in the edge of a latch lever 105 pivoted at 106 to wall 19 of the wrench casing. Latch lever 105 is biased into the path of pin 103 by a spring 107 in the manner clearly illustrated in Figure 1. It will be appreciated that the described latch lever mechanism for normally holding clutch collar 96 retracted may be replaced by suitable alternate controls well known to those skilled in this art.

Interposed between shoulders provided on collar 96 and on the hub of gear 35 is a coil spring 108 urging collar 96 into engagement with teeth 98 on gear 43, the strength of spring 108 being sufficient to assure prompt and positive engagement of clutch teeth 97 and 98 upon the disengagement of latch 105 from pin 103. Additionally, and of particular importance, spring 108 should be sufficiently strong to assure the maintenance of the power drive to gear train 38 during the crucial final stage of the wrenching operation. The manner in which the first described embodiment of the invention operates will now be summarized.

OPERATION OF FIRST EMBODIMENT

Let it be assumed that the described wrench is being used to tighten the cap screws 30 securing an engine head 31 to an engine block, and that final wrenching through an arc of 180 degrees is required to place the screws under their full design load stress. In other words, it has been determined in advance that once the looseness between the parts has been removed, the cap screws must be wrenched through a further and final arc of 180 degrees to place them under a desired optimum load stress. This arc having been determined by any one of several well known techniques, the wrench of this invention is adjusted to rotate the several fasteners through this precise arc and then automatically disengage the power supply from all of the wrenching sockets 22. The preliminary adjustment of the wrench is accomplished simply by loosening set screws 85 securing ring gear 84 to sleeve 82 and rotating the gear relative to the sleeve to align the positioning or indexing mark 89 on the hub of gear 84 with the appropriate reading on scale 88 (Figure 4), and then firmly tightening set screws 85. Since gears 44 and 84 rotate counterclockwise at speed ratio of 2:1, it will be recognized that gear 84 always rotates through an arc exactly one-half the selected arc of final wrenching. Accordingly, scale 88 on ring 87 is preferably calibrated to take into account this speed differential between gears 44 and 84 with the result that a given setting of indicator mark 89 relative to scale 88 represents the arc through which the nuts are finally wrenched before clutch teeth 97, 98 are automatically disengaged to discontinue the complete two-stage wrenching operation. It will therefore be clear that the setting of indicator 89 in Figure 4 is for a final wrenching operation of 180 degrees. The wrench is now in readiness for operation to disengage the power supply automatically as the final wrenching operation reaches the end of the aforementioned 180 degree arc as will be described in greater detail presently.

The wrench having been properly adjusted, fastener engaging sockets 22 are fitted over cap screws 30, care being exercised that the screw heads are seated in recesses 23 of the respeective sockets. The operator having noted that clutch control lever 102 is locked in its retracted position with detent pin 103 engaged behind latch 104 as indicated in dot-and-dash lines in Figure 1, the control switch (not shown) for motor 33 is closed thereby placing the high speed gear train 37 in operation. Torque responsive disconnectors 50 being held closed by springs 55, spindles 21 are driven clockwise to rotate sockets 22 and run screws 30 against head 31 until all looseness has been removed from between the parts being fastened together. When this occurs the resistance to further wrenching will increase very abruptly as the shank of the cap screw is placed under slight tension. This abrupt increase in the torque required to wrench the fasteners is sensed immediately by the individual torque responsive disconnectors 50 in that spring 55 of each disconnector allows pawl 56 to pivot out of holding engagement with detent pins 58 (Figure 5). Gears 40 of the high speed gear train are then free to rotate about spindles 21 without driving the latter and pin 58 carried by the rotating gear will continue to underride pawl 56 on each revolution of the gear. It will be understood that the remaining spindles continue in operation to run each of the cap screws through this preliminary or initial tightening stage, it being immaterial whether some one or more of the screws has been partially run before the wrench was assembled over the screws since disconnectors 50 disengage automatically as the looseness of individual fasteners is removed. In fact, owing to the presence and mode of operation of disconnectors 50, gear train 37 remains in operation after all fasteners have been run through the initial tightening operation, the torque responsive disconnectors providing assurance against further tightening of the fasteners until lever 100 has been unlatched and shifted to connect the driving motor to the low speed gear train 38.

Before describing the final wrenching stage it is important to note that during the running of the fasteners, any backlash present between components of gear train 38 is removed to avoid the possibility of error or variance in the final load stress imposed on the fasteners. This is because bosses 92 carried by the lower end of sleeve 82 (Figure 4) are maintained in abutment with the vertical surfaces 80 of bosses 79 of collar 72 throughout the initial nut running or wrenching operation. Additionally, assurance is provided that the parts of the indexing mechanism assembled on spindle 45 are preset in their exact zero position thereby providing further assurance that the arc of final wrenching will be measured with the desired accuracy, uniformity and preciseness. These ends are accomplished in major part by the operation of meshing gears 69 and 84, the former being keyed to rotate with the first one of the driven wrenching spindles 21 and the latter being supported concentrically of sleeve 82 (Figure 4) which is journaled on the upper end of stationary spindle 45 and forming a highly essential part of the indexing mechanism. As here shown by way of example, ring gear 84 has a diameter twice that of gear 69 and therefore rotates at one-half the speed of the latter. Gear 69, being keyed to the first of the wrenching spindles 21 (all of which rotate clockwise) is effective to rotate gear 84 counterclockwise.

As is made clear by Figure 4, the counterclockwise rotation of gear 84 during the initial wrenching operation rotates bosses 92 projecting from the end of sleeve 82 into contact with the axially extending surface 80 of bosses 79 projecting from collar 72. The engagement of bosses 92 with bosses 79 on collar 72 is effective through splines 71, 72 to rotate gear 44 and thereby the entire gear train 38 at one-half the speed of spindles 21 during the initial wrenching operation. It will be understood that when bosses 92 are in contact with bosses 79 in the manner described, indexing mark 89 of the indexing mechanism is aligned with the zero reading position of scale 88 on scale ring 87. Further rotation of gear 84 operates through collar 72 to drive all components of train 38 to remove any backlash.

The rotation of train 38 during the preliminary fastener running operation effects the rotation of cup-shaped members 61 of the one-way clutch devices 51. However, since the rotation of outer members 61 is at one-half the speed of rotation of inner sleeve members 60, cam members 65 remain out of locking engagement and permit the described differential speed of members 60 and 61. Once the fastening device being run by the one of spindles 21 nearest the driving motor has been tightened sufficiently to disengage the associated disconnector 50, the power supply to gear train 38 by way of gears 69 and 84 is discontinued. However, two important purposes have been served, namely, the setting of the indexing mechanism in its zero position, and the removal of any backlash between components employed in the final wrenching operation.

To initiate the final wrenching operation, the operator pivots latch lever 105 to the right as viewed in Figure 1 allowing spring 108 to engage clutch collar 96 with teeth 98 on gear 43. Simultaneously with this operation yoke 76 rotates clockwise to shift collar 72 upwardly as viewed in Figure 4 for subsequent use in bringing bosses 79 into the path of bosses 90 on ring gear 84 to effect disengagement of clutch members 96, 98 at the end of the 180 degree final wrenching arc. Disconnectors 50 being disengaged, the operation of gear train 38 is effective through one-way clutch devices 51 to rotate spindles 21 at slow speed to rotate each of the fasteners clockwise through the same final arc of 180 degrees, clutches 51 being operative to close automatically and instantly upon the rotation of the outer cup-shaped members 61 at a higher rate than the inner sleeve members 60. As the right-hand one of spindles 21, as viewed in Figure 4, begins to rotate, gear 69 rotates gear 84 of the indexing mechanism to measure the wrenching arc.

For reasons explained in the first paragraph describing the operation of the first embodiment, the final wrenching operation is discontinued automatically at the end of the pre-selected arc of final wrenching in a manner governed by the selected setting of indicator mark 89 relative to scale 88. Once this setting is determined, set screws 85 are tightened locking gear 84 to sleeve 82 with bosses 79 and 90 appropriately spaced apart circumferentially of collar 72 and gear 84. Since bosses 79 are always in engagement with bosses 92 at the beginning of final wrenching for reasons explained above, it follows that, as the nuts are wrenched through the final stage of the preselected arc of final wrenching, as 180 degrees, cam surfaces 81, 91 of the respective bosses 79 and 90 will contact and act to cam collar 72 downwardly along splines 71 of gear 44. This downward movement of collar 72 pivots yoke 76 counterclockwise about trunnions 77 to disengage clutch teeth 97, 98 thereby discontinuing the wrenching operation by disconnecting the power supply to gear train 38. It is also pointed out that as the power supply is disconnected, pin 103 on the end of lever 102 fixed to yoke 76 is latched behind detent 104 of latch lever 105. Inasmuch as all looseness between the parts being secured together was removed before final wrenching was initiated, the wrenching of all nuts through identical final arcs assures that all shanks are equally stressed to a desired predetermined value.

The gang wrench may be coupled directly to another set of similar fasteners following the same procedure outlined above, it being unnecessary to make any preliminary adjustments inasmuch as the only essential ones are made automatically during the initial running operation on the new group of fasteners. That is to say, the rotation of gear train 37 during the initial running operation of the next group operates through gears 69 and 84 to reset the indexing mechanism in its zero position and to remove backlash from the gears of train 38.

It will be recognized that a gear ratio other than that specified above may be employed for gears 69 and 84 in which event it is necessary to employ a different scale 88 properly divided for use with the different gear ratio. It will also be understood that different length fasteners may require a different arc of final wrenching to place them under an optimum load stress. It has been found that normally encountered fasteners may be brought to the desired load stress by wrenching through a final arc appreciably less than 360 degrees and usually not in excess of 180 degrees.

It will be recognized that the power wrenching device illustrated in Figures 1 to 9 utilizes principles disclosed in my patent entitled "Screw Tensioning Device," Patent No. 2,734,412, granted to me on February 14, 1956, as well as the principles of the invention disclosed in my copending application for Letters Patent entitled "Apparatus for Screw Tensioning to Elongation Values" filed by me on December 28, 1955, Serial No. 555,804, now Patent 2,889,729 granted June 9, 1959.

SECOND EMBODIMENT

The second embodiment illustrated in Figure 10 employs many components identical with or similar to those of the first described construction. All such components have been designated by the same numeral distinguished by a prime, and for this reason a duplicate description of these will be unnecessary. It will be understood that the second embodiment is generally similar to the first and comprises, as principal components, high and low speed gear trains 37' and 38', respectively, arranged to be driven selectively from a driving motor 33'. Each of the fastener-receiving sockets 22' is supported at the lower end of a spindle passing through gears of trains 37', 38' and including on an intermediate portion thereof a torque responsive disconnector 50' and a one-way clutch device 51'. As will be apparent from a comparison of Figures 4 and 10, the second embodiment omits the indexing mechanism together with its function, this mechanism being used in the first described construction to measure the arc of final wrenching and to effect disengagement of the power supply as this arc is completed. In lieu of the indexing mechanism, the wrench illustrated in Figure 10 employs a specially constructed clutch having a calibrated spring cooperating with this clutch to hold the power supply engaged to gear train 38' until the aggregate torque applied to all the fasteners reaches a predetermined value known as required to place the individual fasteners under an optimum load stress.

The torque responsive clutch mechanism for the final wrenching operation is shown mounted on the rotatably supported shaft 36', the opposite ends of which are mounted in ball bearings supported in casing walls 19', 20'. Unlike the first described embodiment, the large diameter gear 35' of train 37' is rotatably supported on shaft 36' and has an externally threaded hub 115. Mounted on hub 115 is a nut 116 flange 117 of which is provided with a scale 118 cooperating with a second scale 119 secured to and projecting from the adjacent face of gear 35'. Locking nut 116 in any desired adjusted position is a set screw 120.

Supported on the splined mid-portion 95' of shaft 36' is a clutch collar 96' having an annular groove into which extend trunnion pins 101' rigidly secured to a lever 102' pivotally supported at one end on a bracket 78'. The opposite end of lever 102' has a detent pin 103' cooperating with latch 104' carried in a latch lever 105' pivotally supported from the casing at 106'. Clutch collar 96' differs from that of the first embodiment by having teeth 97' each provided with a steeply cammed face and a gradually inclined face cooperating with the similarly shaped teeth 98' on the hub of gear 43'.

It will be understood that the steeply inclined portions of teeth 97', 98' are effective to maintain a power drive to gear train 38' until the more gradually inclined surfaces come in contact whereupon further power drive to train 38' ceases. Seated between flange 117 of nut 116 and the facing shoulder on clutch collar 96' is a coil spring 121 of the requisite strength. This spring is placed under high compression by the adjustment of nut 116 on hub 115 to maintain the power drive to the low speed gear train 38' until the aggregate torque applied to all fasteners being wrenched reaches a predetermined value whereupon spring 121 allows clutch collar 96' to shift axially along splined portion 95' of shaft 36' to disengage teeth 97' and teeth 98'. As the highest portions of teeth 97' and 98' come into contact following the termination of wrenching, collar 96' is shifted far enough to pivot lever 102' above latch 104' in opposition to spring 122 thereby providing assurance that the clutch is latched out of engagement until the next fastener tightening operation.

OPERATION OF SECOND EMBODIMENT

The above described alternate construction is used in the same general manner as the first described form. Before placing the wrench upon the fasteners being tightened, the operator checks to make certain that nut 116 controlling the strength of spring 121 is properly positioned to assure tightening of the fasteners to the desired load stress. This is done by checking scale 118 against scale 119, while gear 35' is in its zero position. Although any position of gear 35' can be selected for this purpose, it is convenient to select a zero setting such that scale 119 is positioned on a line through the axes of shaft 36' and of motor 33'. To adjust nut 116, set screw 120 is loosened and the nut is rotated in the direction required to provide the desired alignment of scales 118 and 119 after which screw 120 is retightened, it being understood that varying the position of nut 116 varies the axial force imposed on clutch collar 96' by spring 121.

The torque responsive clutch having been properly set, sockets 22' of the wrench are fitted over the fasteners and motor 33' is energized to drive the high speed train 37' and spindles 21' in the same manner described for the first embodiment to run the fasteners until all looseness is removed between the parts being clamped together. As the looseness of individual fasteners is removed, torque responsive disconnectors 50' disengage to discontinue the power supply to the fasteners. After the fasteners have been run down to an initial tightness as aforedescribed, the operator unlatches lever 102' by shifting latch lever 105' to the right allowing spring 121 to close the clutch by bringing teeth 97', 98' into seating engagement. The motor is then effective through gear 35', shaft 36' and pinnion 43' to drive the low speed gear train 38' thereby wrenching the fasteners through identical final arcs as the torque resistance of the fasteners increases. When the aggregate wrenching torque reaches the predetermined value for which spring 121 has been set, the spring is unable to maintain teeth 97' and 98' engaged and clutch collar 96' shifts axially compressing spring 121 and elevating lever 102' until detent 103' is positioned behind latch 104'. The power drive to the wrench is then ineffective to wrench the fasteners further and the device may be detached from the fasteners.

As will be appreciated, any variation in the torque resistance of the fasteners as they are being wrenched through the final arc is distributed between all fasteners through the medium of the common interconnecting gear train 38'. The significance of this is emphasized. For example, if the manufacturing variances between a pair of fasteners is such as to require an unusually high wrenching force, the increase over and above that of the other fasteners is, in effect, distributed equally among all of the fasteners as viewed from the standpoint of the power required to wrench the fasteners simultaneously from a given power source. This aspect of the invention is emphasized because owing to this feature, it is possible and practicable to wrench a plurality of fasteners simultaneously through the same arc to place them under substantially identical load stresses closely approaching the yield point of the material notwithstanding commonly experienced manufacturing tolerance variations.

While the particular gang torque wrench herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. In apparatus for tightening a plurality of threaded fasteners simultaneously, a power source, separate driven means for each of said fasteners, driving means actuated by said power source for driving said separate driven means, said driving means including a plurality of clutch means individual to the driven means and operable to disengage as each of said fasteners is wrenched with a predetermined torque moment, and means for thereafter wrenching said fasteners through a final arc of uniform extent.

2. In apparatus for tightening a plurality of threaded fasteners simultaneously, a rigid casing having a rotary power supply, a plurality of driven elements each adapted to be coupled to a different one of said fasteners, driving means including torque limiting means interconnecting said power supply and said driven elements operable to wrench said fasteners simultaneously with a predetermined torque moment, said torque limiting means being effective to discontinue wrenching as each fastener is wrenched with a predetermined torque moment, and means operable from said power supply for wrenching each of said partially tightened fasteners through a final arc of uniform extent.

3. In apparatus of the type defined in claim 2 wherein said means for wrenching said fasteners through the final arc includes means for discontinuing wrenching automatically upon the rotation of said fasteners through said predetermined arc.

4. In apparatus for tightening a plurality of threaded fasteners simultaneously, a casing having a continuously operating driving motor, a plurality of rotatable fastener wrenching devices having means providing a disconnectable driving connection with said motor, each of said driving connection means being operable to wrench said fasteners to a substantially uniform initial tightness, means thereafter operable by said motor for wrenching each of said fasteners through identical final arcs of substantially less than 360 degrees and for discontinuing said wrenching when the fasteners have been wrenched through said final arc, said continuously operating motor then being ineffective to further tighten said fasteners despite the connection of said apparatus with said fasteners.

5. A self-contained apparatus for tightening a plurality of threaded fasteners simultaneously from a driving motor forming a part of said apparatus, said apparatus including a plurality of rotatable wrenching elements each adapted to fit about a fastener to be tightened, a first and a second gear train selectively operable by said motor to drive said wrenching elements, said first train including means for rendering the same ineffective to drive a particular one of said wrenching elements as individual fasteners reach an initial tightness wherein looseness between the parts is removed, and means for thereafter wrenching said fasteners through the same predetermined final arc by means of said motor and said second gear train.

6. A self-contained apparatus as defined in claim 5 including means automatically operable to disconnect the power drive to said fasteners when said fasteners have been wrenched through said final arc.

7. A self-contained apparatus as defined in claim 6 including means for locking the power supply disengaged from said second gear train following the conclusion of said final wrenching operation.

8. In combination, a power torque wrench comprising, wrenching means adapted to be coupled to a screw type fastener, power means for driving said wrenching means including means selectively operable to wrench a fastener through an initial running operation at high speed, means automatically discontinuing the wrenching when the looseness between the parts has been removed, and means for thereafter driving said wrenching means through a final arc at a relatively slower speed to place the fastener under a predetermined optimum load stress and for then automatically discontinuing the power drive to the fastener.

9. The combination defined in claim 8 wherein the wrenching means includes a first gear train driven at high speed for running a fastener through said initial running operation, a second gear train operable at a relatively slower speed for wrenching a fastener through said final arc, and manually controlled means for initiating said final slow-speed wrenching operation.

10. The combination defined in claim 9 wherein said low- and high-speed gear trains are mounted on a common spindle coupled to said fastener wrenching means, and a one-way overrunning clutch interconnecting said second gear train and said spindle operative to drive said spindle when said second gear train is driven in a direction to tighten a fastener.

11. The combination defined in claim 8 including clutch means operable automatically to disengage said high-speed gear train drive for said wrenching means when a fastener has been wrenched through said final arc.

12. In combination, a power torque wrench comprising, a wrench casing, a first and a second gear train therein having a spindle common to both trains and adapted to be coupled to a fastener to be tightened, power driving means supported on said casing and including a clutch selectively operable to drive said second gear train, a pair of drive disconnectors interconnecting said gear trains and said spindle, a first one of said disconnectors being disengageable in response to a driving torque in excess of a predetermined value, and the second one of said disconnectors being automatically engageable to connect said second gear train to said spindle to drive the same following the disengagement of said torque responsive disconnector and the closing of said clutch.

13. A power torque wrench as defined in claim 12 including means for automatically discontinuing the wrenching of a fastener by said second gear train when the stress load placed on the fastener by the wrenching of the same reaches a predetermined value.

14. A power torque wrench as defined in claim 12 including means operable by said first gear train during the initial wrenching operation to remove backlash from said second gear train.

15. A power-driven gang torque wrench having first and second drive means for driving simultaneously a plurality of wrenching devices, a driving motor, means connecting said motor directly to said first drive means, a pair of drive clutches for each of said wrenching devices arranged between one of said drive means and each of said wrenching devices, one of said drive clutches comprising a one-way overrunning clutch and the other comprising a torque responsive clutch disengageable when the driving torque exceeds a predetermined value, and means for connecting said driving motor to said second drive means by a low speed high torque gear train.

16. A power-driven gang torque wrench as defined in claim 15 wherein said wrenching devices each comprises a spindle common to both of said first and second drive means and providing a support for said pair of drive clutches.

17. A power-driven gang torque wrench as defined in claim 15 wherein said pair of drive clutches is mounted on a common supporting spindle, means including said spindle providing a rigid connection between one part of each of said clutches, and separate means providing a driving connection between said spindle and another part of each of said clutches.

18. A power-driven gang torque wrench as defined in claim 17 including an indexing mechanism for measuring the arc of final wrenching by said second drive means, and means for resetting said indexing mechanism to a zero starting point including a driving connection to one of said spindles whereby said indexing mechanism is reset during the use of the wrench to run a fastener toward an initial tightening position.

19. A power-driven gang torque wrench as defined in claim 17 including means providing a drive connection between said drive means and one of said spindles at a point between the associated pair of clutch means, said drive connection being operable to remove backlash between the components of said second drive means while the first drive means is operating to wrench fasteners.

20. A power-driven gang torque wrench having first and second gear trains arranged to be driven at different speeds from a common driving motor, a plurality of wrenching devices including a plurality of sets of drive disconnectors for driving said wrenches from either of said trains, one set of said drive disconnectors being operable to run a plurality of fasteners simultaneously and to disengage individually as a particular fastener connected therewith is tightened through a predetermined initial tightening operation, and the other set of said drive disconnectors being operable automatically to disengage the power drive simultaneously to all of said wrenching devices after said second gear train has been operated to wrench the fasteners through a final wrenching operation.

21. A power-driven gang torque wrench having first and second gear trains arranged to be driven at different speeds from a common driving motor, a plurality of wrenching devices, means including a pair of series-connected drive disconnectors interconnecting each of said trains with each of said wrenching devices, said first gear train and the associated drive disconnectors being operable to run a plurality of fasteners simultaneously through an initial tightening operation and to permit discontinuance of wrenching automatically as each fastener is tightened to a predetermined extent, and said second gear train being operable to wrench the fasteners through a final wrenching operation, the final wrenching of all fasteners beginning simultaneously and terminating simultaneously.

22. A power-driven gang torque wrench as defined in claim 21 including means for measuring the arc of final wrenching, and means operable to terminate the wrenching when the fasteners have been wrenched through a predetermined arc measured by said arc measuring means.

23. A power-driven gang torque wrench as defined in claim 21 including means for terminating said final wrenching operation automatically when the aggregate wrenching torque for all of said fasteners exceeds a predetermined value.

24. That method of tightening a plurality of threaded fasteners which comprises, running a plurality of the fasteners simultaneously through an initial tightening operation, discontinuing the running of individual fasteners as each is tightened to a point removing looseness between the parts being fastened together, and simultaneously rotating all the fasteners through the same final arc to tension each to substantially the same load stress.

25. That method of tightening a plurality of threaded fasteners uniformly which comprises, simultaneously running a plurality of fasteners of the same size through a preliminary tightening operation, discontinuing the running of the fasteners as individual ones thereof begin to place the shank portion of the fastener under tension, and simultaneously rotating all fasteners through a final tightening operation of the same arcuate extent.

26. That method of tensioning a plurality of similar threaded fasteners to place each under substantially the same predetermined optimum load stress which comprises, running all of the fasteners at the same time to remove looseness between the parts being fastened together, thereafter rotating all of the fasteners until the aggregate required torque exceeds a predetermined value known as required to place the fasteners under the desired load stress, and simultaneously discontinuing the rotation of the fasteners.

27. That method of fastening parts together with a plurality of threaded fasteners in a manner to place the fasteners under substantially the same load stress approaching the yield point of the fastener material, said method comprising utilizing a common power source to run a group of the fasteners through a preliminary tightening operation wherein the looseness between the parts is removed, discontinuing the rotation of individual fasteners as the load stress thereon starts to increase sharply and thereafter utilizing said power source to rotate said fasteners simultaneously until the required power reaches a predetermined value, and discontinuing the rotation of all fasteners at the same time, whereby variations in the power requirements for the final tightening of individual fasteners is divided into as many parts as the number of fasteners being tensioned.

28. That method of equalizing variations in manufacturing tolerances between threaded fasteners of a given commercial size which comprises, utilizing a single power source to run a plurality of the fasteners simultaneously against parts being fastened together, discontinuing the running of individual fasteners as the looseness between its components and the intervening parts is removed, thereafter utilizing said power source to rotate each of said fasteners simultaneously until the required power reaches a predetermined value precalculated as required to tension a given number of the fasteners to a desired optimum load stress taking into account the average wrenching torque requirements of a representative group of the fasteners, and discontinuing rotation of all fasteners at the same time.

29. A self-contained power-driven gang torque wrench comprising a casing having a plurality of parallel spindles rotatably supported therein, a high-speed gear train supported near one end of said spindles, a low-speed gear train rotatably supported near the other end of said spindles, a single power source continuously connected to said high-speed train, means for connecting said power source to said low-speed train, and means including a one-way over-running clutch for selectively coupling either one or the other of said gear trains to drive said spindles, whereby said one-way clutch is ineffective to drive said low-speed train while the said spindles are being driven by said high-speed train.

30. A self-contained power-driven gang torque wrench comprising, a casing having a plurality of spindles rotatably supported therein interconnected by first and second gear trains, a motor continuously connected to said first train, a plurality of pairs of clutches connected in series between said gear trains with each pair being supported on a different one of said spindles, means providing a driving connection between a spindle and the series connection between an associated pair of said clutches, said first train being operative to drive said spindles while one clutch of said pairs of clutches remains engaged, and the second clutch of said pairs of clutches being automatically engageable to drive said spindles from said second train after the disengagement of said one of said pairs of clutches.

31. In apparatus for tightening a plurality of threaded fasteners, a plurality of driven elements adapted to be coupled to a plurality of said fasteners, driving means operable to wrench each of said fasteners with a limited torque moment, power transmitting means interconnecting said driven elements to be driven thereby in relative rotary relation, and control means to limit said power transmitting means to rotate said drive elements simultaneously through a final arc.

References Cited in the file of this patent
UNITED STATES PATENTS

| | | |
|---|---|---|
| 2,069,882 | Hall | Feb. 9, 1937 |
| 2,616,323 | Leifer | Nov. 4, 1952 |
| 2,627,770 | Hautau et al. | Feb. 10, 1953 |
| 2,691,314 | Stevens et al. | Oct. 12, 1954 |
| 2,720,803 | Rice et al. | Oct. 18, 1955 |
| 2,734,412 | Orner | Feb. 14, 1956 |
| 2,741,352 | Stevens et al. | Apr. 10, 1956 |
| 2,781,682 | Herndon | Feb. 19, 1957 |
| 2,796,789 | Rice et al. | June 25, 1957 |
| 2,833,321 | Hautau et al. | May 6, 1958 |
| 2,835,365 | Rice et al. | May 20, 1958 |
| 2,867,144 | Stevens | Jan. 6, 1959 |
| 2,889,729 | Orner | June 9, 1959 |
| 2,893,278 | Rice et al. | July 7, 1959 |